Figure 2A:
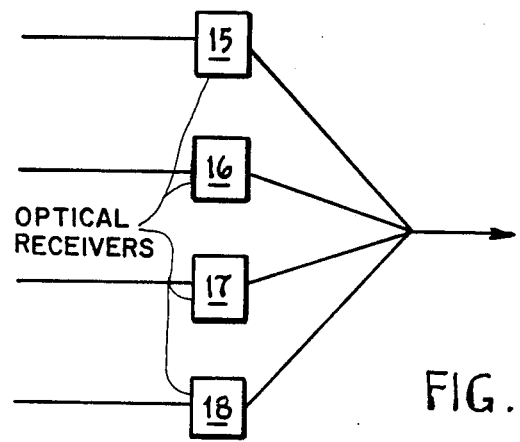

United States Patent [19]

Beasley et al.

[11] 4,234,970
[45] Nov. 18, 1980

[54] FIBER OPTIC COMMUNICATION SYSTEM

[75] Inventors: Robin D. Beasley, Chatham; Trevor I. Hall, Rochester; Trevor A. Morgon, Rainham, all of England

[73] Assignee: Elliott Brothers (London) Limited, Chelmsford, England

[21] Appl. No.: 955,460

[22] Filed: Oct. 27, 1978

[30] Foreign Application Priority Data

Nov. 3, 1977 [GB] United Kingdom ............... 45764/77

[51] Int. Cl.³ .............................................. H04B 9/00
[52] U.S. Cl. .................................... 455/607; 350/96.16
[58] Field of Search ...................... 250/199; 350/96.16; 455/601, 602, 607, 617

[56] References Cited
U.S. PATENT DOCUMENTS

| | | | |
|---|---|---|---|
| 3,845,293 | 10/1974 | Borner | 250/199 |
| 3,883,222 | 5/1975 | Gunderson | 350/96.16 |
| 3,943,358 | 3/1976 | Reymond | 250/199 |
| 4,017,149 | 4/1977 | Kao | 250/199 |
| 4,027,153 | 5/1977 | Käch | 350/96.16 |
| 4,090,067 | 5/1978 | Bell | 455/607 |
| 4,092,059 | 5/1978 | Hawkes | 350/96.16 |
| 4,143,941 | 3/1979 | Soref | 350/96.16 |

Primary Examiner—Howard W. Britton
Attorney, Agent, or Firm—Kirschstein, Kirschstein, Ottinger & Cobrin

[57] ABSTRACT

A multi-access fiber optic communication system in which each terminal of the system is directly connected with n other terminals of the system via point-to-point transmitting and receiving links and each terminal of the system includes regenerating means whereby a signal received by that terminal is re-transmitted to the other n terminals. The signals are pulse signals and the regenerating means are arranged to re-transmit a received pulse in response to the leading edge of a received pulse.

10 Claims, 4 Drawing Figures

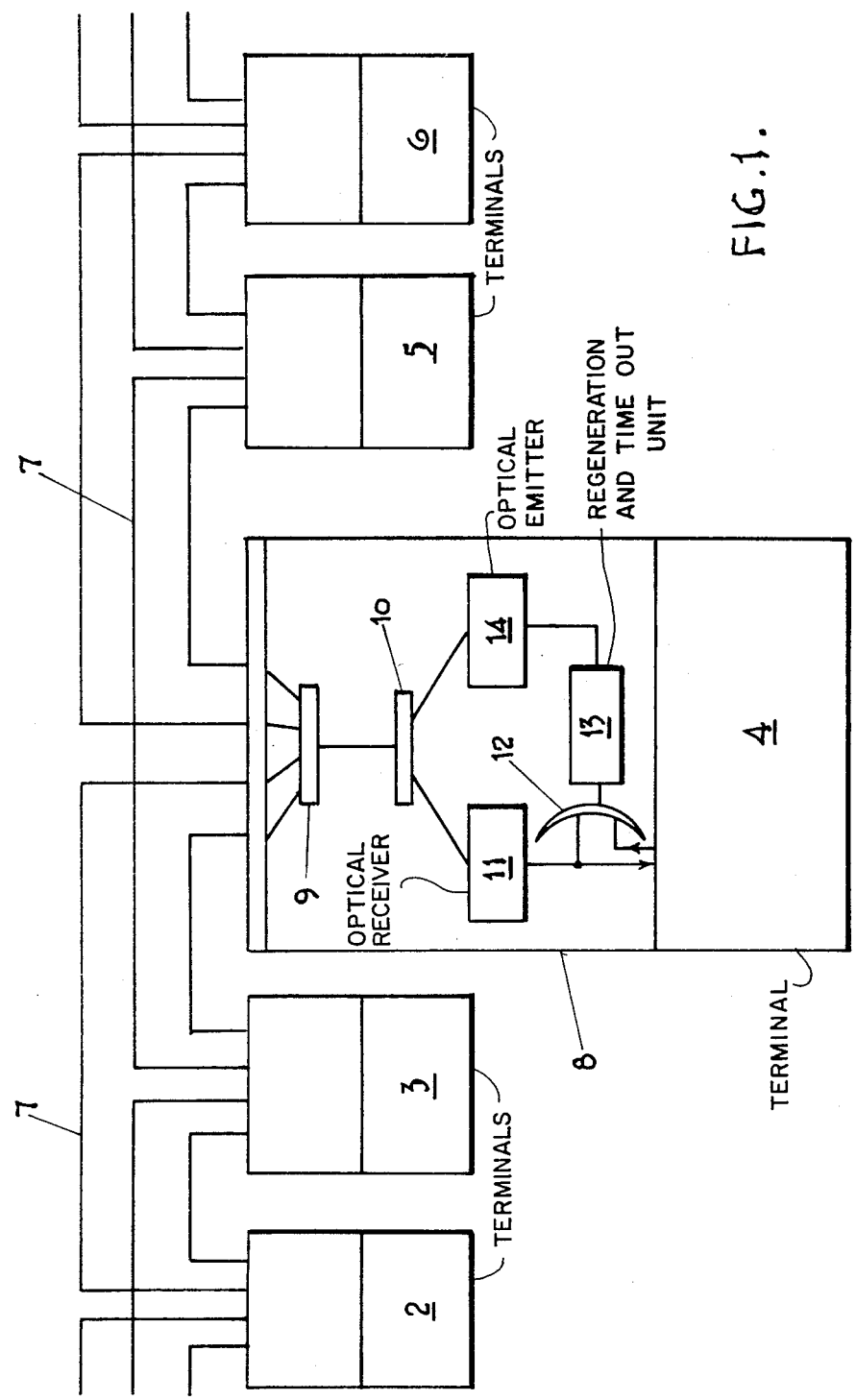

FIBER OPTIC COMMUNICATION SYSTEM

This invention relates to fibre optic communication systems.

The invention relates particularly to fibre optic communication systems of the kind comprising at least three terminals each arranged to transmit and/or receive optical signals to and/or from any other terminal of the system. Such a system will be hereinafter referred to as a multi-access fibre optic communication system.

It has been proposed to implement multi-access fibre optic communication systems by interconnecting the terminals via a main optical fibre highway, each terminal being connected to the highway by means of a light splitting device such as an optical "T" junction. However, such a proposal is subject to the disadvantage that additional losses are introduced into the light paths, and since the number of ways in which the light is split increases with the number of terminals, this provides a severe limitation as to the number of terminals which can be used.

It is an object of the present invention to provide a multi-access fibre optic communication system wherein the above mentioned disadvantages may be overcome.

According to the present invention, in a multi-access fibre optic communication system at least one terminal is individually connected via a point-to-point receiving link to at least one of the other terminals and via a point-to-point transmitting link to at least one of the other terminals, and said terminal includes regenerating means whereby a signal received by that terminal is re-transmitted to the other terminal or all the other terminals to which that terminal is directly connected via a said point-to-point transmitting link.

Preferably each terminal is so connected and includes such regenerating means. Thus, each terminal has one or more receiving links and one or more transmitting links. It will be appreciated that on any terminal the number of receiving links need not be the same as the number of transmitting links, and further, that a receiving and a transmitting link of any terminal need not be directly connected to the same other terminal.

Preferably a receiving link and a transmitting link of each said terminal are directly connected to the same other terminal and each said terminal is directly connected with a different selection of n of the other terminals of the system. In one such system, taking the terminals in a particular sequence, each said terminal is directly connected with n/2 terminals on either side of it in said sequence. It will be understood that the sequence is preferably chosen so as to minimise the length of the required optical fibre connections.

Normally in such a system each terminal is arranged to transmit to and receive from any other terminal.

Preferably each direct connection between a pair of said terminals is via one fibre optic link adapted for bi-directional light transmission.

Preferably, where the regenerating means of each terminal has a discrete input and output, said input and output are respectively connected to a respective one of the two arms of a two-way optical "Y" junction, and the leg of the junction is connected to the leg of an n-way optical "Y" junction whose arms are respectively connected to the links via which that terminal is connected with n other terminals of the system.

Preferably the transmitted signals are pulse signals. In such a system preferably each said regenerating means is arranged to re-transmit a received pulse in response to the leading edge of a received pulse.

Preferably each said regenerating means includes time out means for preventing regeneration of a received pulse after the regeneration of an earlier received pulse for a period sufficient to prevent regeneration of said earlier received pulse a second time.

In a system according to the invention the regenerating means suitably comprises a receiver arranged to convert an optical signal into an electrical signal, an electrical signal generator, and a transmitter arranged to convert a generated electrical signal into an optical signal.

Preferably, where each terminal is arranged to transmit to and receive from any other terminal, the regenerating means is arranged so that the output of said receiver is connected to one input of an OR gate and to the electrical input of that terminal and the electrical output of that terminal is connected to another input of the OR gate, the output of the OR gate being connected to said electrical signal generator.

Preferably the optical and the electrical signals are pulse signals.

Figure 2B:
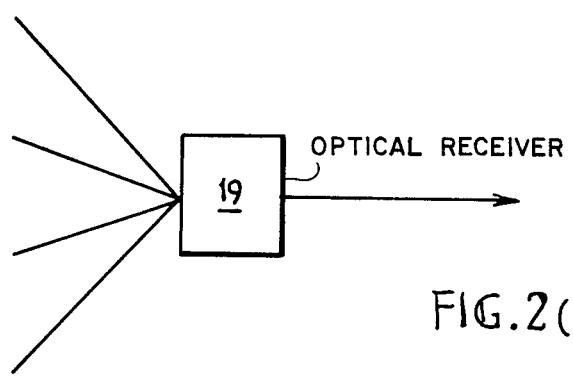
Figure 2C:
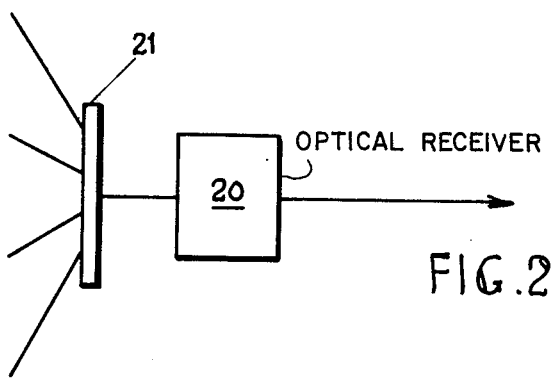

In order that the invention may be more fully understood, one embodiment thereof will now be described, by way of example only, with reference to the accompanying drawings, in which:

FIG. 1 is a schematic diagram of part of a system according to the invention; and FIGS. 2a, 2b and 2c show alternative arrangements of part of FIG. 1.

Five terminals, 2 to 6, of the system are shown, each terminal having electrical signal encoding means (not shown) and decoding means (also not shown) and the terminals being interconnected by one fibre optic cable 7. Included in each terminal of the system is an identical regenerating arrangement, only one of which, 8, that included in terminal 4, is shown.

The regenerating arrangement 8 is connected via four optical fibres 7 to the regenerating arrangments of the four other terminals 2, 3, 5 and 6. These optical fibres are each connected in the regenerating means 8 to a respective one of the arms of a four-way optical "Y" connector 9. The leg of the optical "Y" connector 9 is connected via the leg and one arm of a two-way optical "Y" connector 10 to a receiver 11. The receiver 11 thus receives an optical signal from the regenerating arrangment associated with any one of the terminals 2, 3, 5 or 6 and converts it into an electrical signal. This electrical signal is passed to the decoding means of the terminal 4 and also to one input of a two-input OR gate 12. The other input of the OR gate 12 is arranged to receive electrical output signals from the encoding means of the terminal 4. The output of the OR gate 12 is connected via a regeneration and time-out unit 13, whose function will be described below, to a transmitter 14. The transmitter 14 converts electrical signals applied to it into optical signals. The optical signals produced by the transmitter 14 are passed to the leg of the four-way optical "Y" connector 9 via the other arm and leg of the two-way optical "Y" connector 10 and hence to the regenerating arrangements associated with the terminals 2, 3, 5 and 6. Thus the optical fibres 7 operate as bidirectional links.

The system operates by using pulses of fixed width and by varying their separation. In operation of the system a signal comprising a series of fixed width pulses, having separations greater than a predetermined minimum separation for the system, are received at the regenerating arrangement 8 included in the terminal 4. As an optical pulse is received by the receiver 11, an electrical pulse corresponding to the optical pulse is passed to the decoding means of the terminal 4 and through OR gate 12 to the regenerating and time out unit 13. On receipt of the leading edge of this electrical pulse (corresponding to the leading edge of the optical pulse) the regenerating and time out unit 13 is triggered to produce a similar electrical pulse. This electrical pulse is applied to the transmitter 14 which produces a corresponding optical pulse. Thus an optical pulse received by the regenerating arrangement 8 from the regenerating arrangement included in one of the terminals 2, 3, 5 or 6 is transmitted in electrical form to the decoding means of the terminal 4 and is re-transmitted to the regenerating arrangements included in the terminals 2, 3, 5 and 6. In this way a signal comprising a series of fixed width optical pulses is passed along the terminals of the system.

In order that the regeneration and time out unit 13, once triggered by the leading edge of a pulse of an optical signal being transmitted through the system is not re-triggered by the same pulse which has been differently delayed (i.e. has arrived at the regenerating arrangement via a route of different length) or by reflections within the system, the regeneration and time out unit 13 is so arranged that, once triggered, it cannot be re-triggered until after a predetermined time delay. It will be appreciated that the time delay is long enough not to allow the regeneration and time out unit 13 to be re-triggered by reflected or differently delayed pulses but short enough to allow the unit 13 to be re-triggered by the next pulse of the signal.

It will be appreciated that although the system described above uses single strand optical fibres, multi-strand fibres or cables could alternatively be used.

It will be appreciated the other terminals of the system of which the terminals 2, 3, 4, 5 and 6 form part may be so connected either that the terminals are arranged in an open path, enabling the system to achieve high data rates, or that the terminals are arranged in a closed path, lowering the data rate but providing increased failure survivability.

It will also be appreciated that although the system described above by way of example has a duplex interconnection arrangement, thus providing a high failure survival capability, a system according to the invention may alternatively have some other interconnection arrangement to achieve a desired balance between high data rates, high failure survival capability and simplicity of interconnection.

It will further be appreciated that although the system of the above example uses bi-directional optical links, a system according to the invention may use unidirectional optical links.

It will also be appreciated that other arrangements of the regenerating arrangement 8 may alternatively be used. FIG. 2(a) shows an alternative arrangement of part of the regenerating arrangment 8 in which each input to the regenerating arrangement is applied to a respective receiver 15–18, the electrical outputs of the receivers being combined and applied to the decoding means of the terminal 4 and to the OR gate 12.

FIG. 2(c) shows an arrangement in which each input to the regenerating arrangement 8 is applied to a single input of a single receiver 19 whose electrical output is applied to the decoding means of the terminal 4 and to the OR gate 12.

FIG. 2(b) shows an arrangement in which each input to the regenerating arrangment 8 is applied to a single receiver 20 via an optical "Y" junction 21, the electrical output of the receiver 20 being applied to the decoding means of the terminal 4 and to the OR gate 12.

It will be appreciated that alternative arrangements of the regenerating arrangement 8 may additionally or alternatively have one or more tranmitters arranged similarly to the receivers in any one of the arrangements of FIG. 2, and that the arrangements may be arranged for use with bi-directional links by combining the inputs and outputs in one or more common optical junctions.

What we claim is:

1. A multi-access fibre optic communication system comprising at least a first terminal, a second terminal and a third terminal, said first terminal being connected to transmit optical signals directly to at least said second terminal and said third terminal, and said second terminal being connected to transmit optical signals directly to at least said third terminal, wherein said second terminal includes regenerating means whereby an optical signal received by that terminal is re-transmitted to all the terminals to which that terminal is connected to transmit signals directly.

2. A system according to claim 1 wherein each terminal includes such regenerating means and each terminal is connected to transmit optical signals directly to a different selection of n of the other terminals of the system, n being an integer.

3. A system according to claim 2 wherein n is even and, taking the terminals in a particular sequence, each terminal is connected to transmit optical signals directed to the n/2 terminals on either side of it in said sequence.

4. A system according to claim 2 wherein each connection between a pair of the terminals is via one fibre optic link adapted for bi-directional light transmission.

5. A system according to claim 4 wherein the regenerating means of each said terminal has a discrete input and output which are respectively connected to a respective one of the two arms of a two-way optical "Y" junction, and the leg of the junction is connected to the leg of an n - way optical "Y" junction whose arms are respectively connected to the links via which that terminal is connected with n other terminals of the system.

6. A system according to claim 1 wherein the optical signals are pulse signals.

7. A system according to claim 6 wherein the regenerating means is arranged to re-transmit a received pulse in response to the leading edge of a received pulse.

8. A system according to claim 6 wherein the regenerating means includes time out means for preventing regeneration of a received pulse after the regeneration of an earlier received pulse for a period sufficient to prevent regeneration of said earlier received pulse a second time.

9. A system according to claim 1 wherein the regenerating means comprises a receiver arranged to convert an optical signal into an electrical signal, an electric signal generator, and a transmitter arranged to convert a generated electrical signal into an optical signal.

10. A system according to claim 9 wherein the regenerating means is arranged so that the output of said receiver is connected to one input of an OR gate and to the electrical input of that terminal and the electrical output of that terminal is connected to another input of the OR gate, the output of the OR gate being connected to the electrical signal generator.

* * * * *